2,551,996

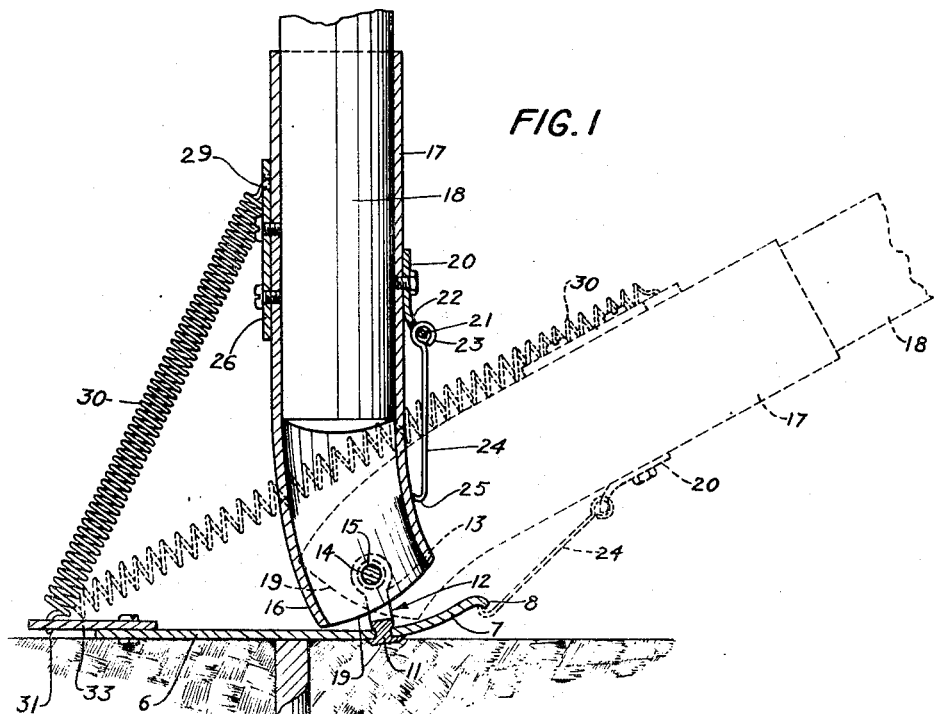
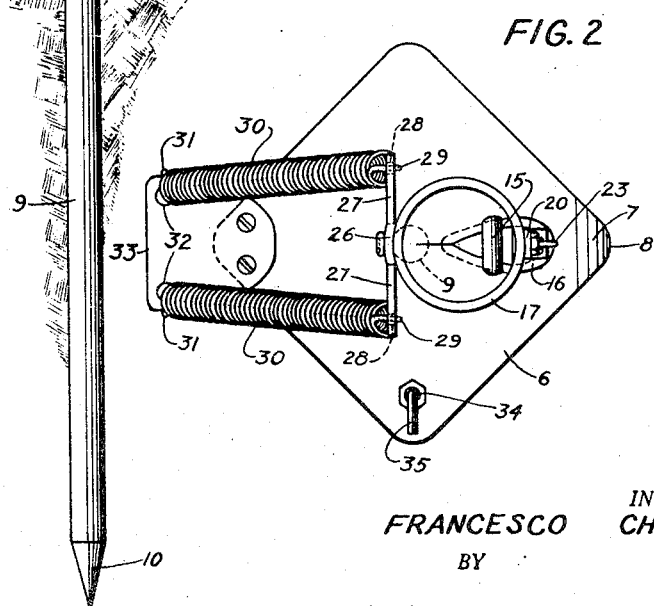
INVENTOR.
FRANCESCO CHERUBINI
BY
McMorrow, Berman & Davidson
Attorneys May 8, 1951  F. CHERUBINI  2,551,996
SUPPORT FOR FISHING RODS
Filed Oct. 24, 1947  2 Sheets-Sheet 2
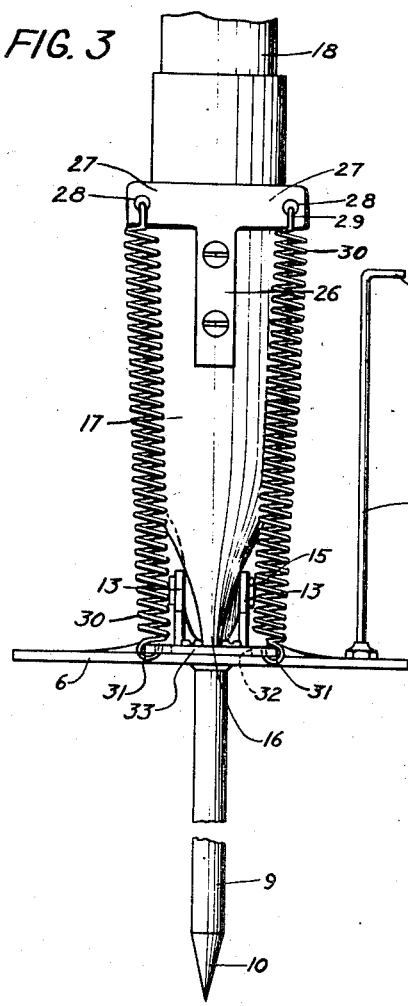
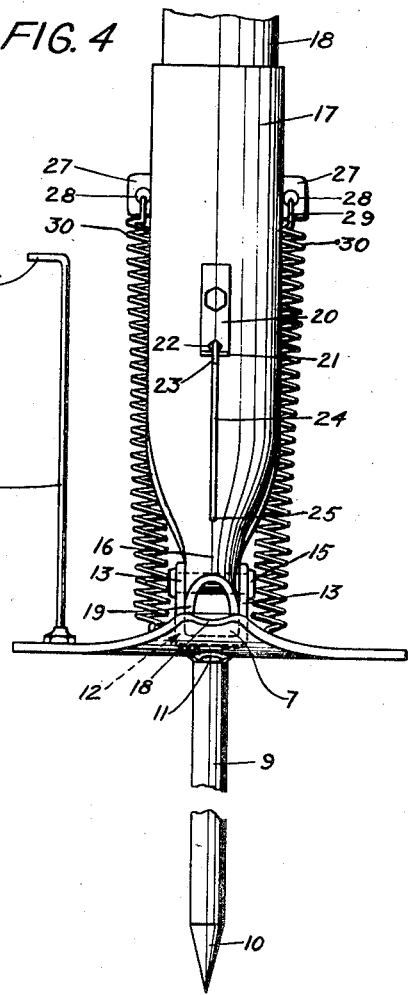
INVENTOR.
FRANCESCO CHERUBINI
BY
McMorrow, Berman + Davidson
Attorneys Patented May 8, 1951

UNITED STATES PATENT OFFICE 2,551,996

SUPPORT FOR FISHING RODS

Francesco Cherubini, Dawson, N. Mex.

Application October 24, 1947, Serial No. 781,866

1 Claim. (Cl. 43—15)

My invention relates to a device for automatically catching fish.

An important object is to provide a device to support a conventional casting rod in a steady or cocked position, said device jerking the rod upwardly to catch the fish when it bites at the line.

A further object of the invention is to provide a device of the above mentioned class which is simple, durable, and quite inexpensive to manufacture.

Other objects and advantages of the invention will be apparent during the course of the following description.

In the accompanying drawings, forming a part of this application, and in which like numerals are employed to designate like parts throughout the same, Figure 1 is a central vertical longitudinal section through the device embodying the invention.

Figure 2 is a plan view of the same.

Figure 3 is a rear elevation of the device, and

Figure 4 is a front elevation of the same.

In the drawings, where for the purpose of illustration is shown a preferred embodiment of the invention, the numeral 6 designates a substantially horizontal base plate or foot, which is rectangular and slightly upturned at its forward corner, as at 7. The extreme outer edge of the forward corner 7 is downturned to provide a relatively stationary latch element 8. The base plate 6 has rigidly secured to it a vertical depending standard or peg 9, for insertion into the ground, and the standard has a pointed end 10. The standard 9 is disposed at the center of the base plate 6.

Rigidly secured to the top side of the base plate 6, by means of a rivet 11, or the like, is an upstanding U-shaped bracket 12, including vertical arms 13. The bracket 12 is disposed forwardly of the standard 9, Figure 1, and is at the transverse center of the base plate 6. The arms 13 have aligned openings 14 to receive a horizontal pivot pin 15, supported thereby. Arranged between the arms 13, and pivotally mounted upon the pin 15 is the lower flattened end 16 of an upstanding vertically swingable rod handle socket or support 17. The socket 17 is cylindrical and tubular and is open at its top end, to receive the handle 18 of a conventional casting rod therein. The lower flattened end 16 is curved forwardly, as shown clearly in Figure 1, and its bottom edge 19 is curved, as shown.

Rigidly mounted upon the forward side of the tubular socket 10 is a support plate 20, having lower end 21 bent outwardly, and provided with an opening 22 to receive a loop or eye 23 of a pivoted rod or latch element 24. The rod 24 is loosely pivotally connected to the plate 20 and its lower end is bent inwardly to form a latch hook 25, to coact with the latch element 8.

Rigidly mounted upon the rear side of the rod socket 17, opposite from the plate 20, is a T-shaped bracket 26, including lateral arms 27, having openings 28 to receive ends 29 of retractile coil springs 30. The lower ends 31 of the springs 30 are fastened in openings 32 in a horizontal plate or bracket 33, rigidly mounted upon the base plate 6, at the rear corner of the same. The plate 33 projects rearwardly of the base plate 6, as shown.

At one side corner of the base plate 6, a vertically upstanding line post 34 is rigidly mounted. This line post 34 extends upwardly near the arms 27, and has a top lateral extension 35.

In use, the standard 9 is pressed into the ground at the edge of a lake, or the like. The base plate 6 will engage the ground, as shown.

After casting, the handle 18 of the casting rod is inserted in the socket 17. The handle 18 will pass downwardly to the curved and flattened end 16, when it can descend no further. The socket 17 is swung vertically forwardly to the position shown in dotted lines in Figure 1. The forward point or toe of the curved edge 19 engages the base plate 6 to limit the forward swinging movement of the socket. The latch elements are connected, as in Figure 1, and the device is in the cocked position. A portion of the fishing line between the end of the rod and the reel is bound around the line post 34. This prevents the fish, when caught, from jerking on the reel.

When the fish strikes or bites at the line, the rod 18 and socket 17 will be pulled downwardly a further slight amount, releasing the latch element 24. The springs 30 will jerk the socket 17 upwardly to the vertical position, thus automatically catching the fish. The rearmost point or heel of the bottom curved edge 19 engages the base plate to limit the upward swinging of the socket 17.

It is to be understood that the form of the invention, herewith shown and described, is to be taken as a preferred example of the same, and that various changes in the shape, size and arrangement of parts may be resorted to, without departing from the spirit of the invention, or the scope of the subjoined claim.

Having thus described the invention, I claim:

In a device for automatically catching fish, a substantially flat base plate having an upturned corner forming a latch element, a substantially vertical standard secured to the bottom of the base plate, an upstanding bracket secured to the base plate, a pin carried by the bracket, a tubular socket pivotally mounted upon the pin and extending above the base plate and adapted to swing vertically from a cocked to an upright position, a latch element pivotally connected to the socket and adapted to engage the first named latch element to hold the socket in the cocked position, arms secured to the socket, and springs connected with the arms and with the base plate and tending to pull the socket toward the upright position.

FRANCESCO CHERUBINI.

REFERENCES CITED

The following references are of record in the file of this patent:

UNITED STATES PATENTS

| Number | Name | Date |
|---|---|---|
| 693,071 | Ruud | Feb. 11, 1902 |
| 1,488,838 | Savoie | Apr. 1, 1924 |
| 1,859,944 | Waitt | May 24, 1932 |
| 1,957,853 | Sibley | May 8, 1934 |

FOREIGN PATENTS

| Number | Country | Date |
|---|---|---|
| 431,089 | Germany | June 21, 1926 |